United States Patent
Alexanian et al.

[11] Patent Number: 5,914,847
[45] Date of Patent: Jun. 22, 1999

[54] PROGRAMMABLE IRRIGATION VALVE CONTROLLER PROVIDING EXTENDED BATTERY LIFE

[76] Inventors: George Alexanian, 4761 W. Jacquelyn Ave.; Eugene S Carlson, 4582 W. Jacquelyn Ave., both of Fresno, Calif. 93722

[21] Appl. No.: 09/063,871

[22] Filed: Apr. 20, 1998

[51] Int. Cl.[6] .................................................. H01H 47/00
[52] U.S. Cl. ........................................ 361/156; 361/170
[58] Field of Search .................................... 361/152, 156, 361/170, 189, 196, 199; 320/125, 136, 155; 307/85, 86, 115, 31; 239/69, 70

[56] References Cited

U.S. PATENT DOCUMENTS

| | | |
|---|---|---|
| 3,825,153 | 7/1974 | Patrick . |
| 3,921,052 | 11/1975 | Milano . |
| 4,171,539 | 10/1979 | Tawfik . |
| 4,203,153 | 5/1980 | Boyd . |
| 4,279,020 | 7/1981 | Christian et al. ........................ 364/900 |
| 4,423,484 | 12/1983 | Hamilton . |
| 4,645,882 | 2/1987 | Nakayama et al. ...................... 379/387 |
| 4,697,221 | 9/1987 | Pasquarella .............................. 361/156 |
| 4,718,454 | 1/1988 | Appleby . |
| 5,105,329 | 4/1992 | Goldner ................................... 361/156 |
| 5,229,649 | 7/1993 | Nielsen et al. ............................. 307/31 |
| 5,251,325 | 10/1993 | Davis . |
| 5,347,421 | 9/1994 | Alexanian ................................ 361/156 |
| 5,402,303 | 3/1995 | Luck et al. ............................... 361/172 |
| 5,498,951 | 3/1996 | Okamura . |
| 5,566,081 | 10/1996 | Yoshizawa . |
| 5,572,108 | 11/1996 | Windes . |

Primary Examiner—Jeffrey Gaffin
Assistant Examiner—Kim Huynh
Attorney, Agent, or Firm—Mark D. Miller

[57] ABSTRACT

A battery powered irrigation valve controller designed to conserve the life of both the low voltage battery source which operates the microprocessor circuitry as well as the high voltage battery source which operates the external valve solenoids. Energy leakage from the high voltage battery source is prevented by maintaining the primary capacitor in a discharged state and delaying the charging of this capacitor until just before it is to be discharged to the valve solenoid. Unnecessary depletion of the high voltage battery source is also accomplished by isolating this source from the primary capacitor immediately prior to discharge, thereby avoiding a draw of energy from the high voltage battery source itself during discharge. The low voltage battery source which powers the computer circuitry is conserved through the action of the microprocessor which does not run in a continuous current consuming mode, but which remains dormant except for periodic sampling.

18 Claims, 3 Drawing Sheets

PROGRAMMABLE IRRIGATION VALVE CONTROLLER PROVIDING EXTENDED BATTERY LIFE

BACKGROUND OF THE INVENTION

The present invention relates to valve controllers, and more particularly to an improved battery powered programmable irrigation valve controller having extended battery life.

FIELD OF THE INVENTION

Programmable irrigation valve controllers are well known in the art. Such controllers are used to open and close irrigation valves by providing electric current to solenoids located in close proximity to the valves. Relatively large electric currents are required to activate and deactivate such solenoids. Providing this required electricity is a simple matter if an external power source is readily available, such as a power line. However, many controllers must be located at remote field locations where it is impossible or impractical to run a power line or otherwise provide an external power source. Accordingly, programmable battery powered irrigation controllers have been developed.

The most significant limitation of existing battery powered irrigation controllers is battery life. Two sets of batteries are generally required by such controllers: low voltage batteries (e.g. 3.5 volts) to operate the programming circuitry, and higher voltage batteries (e.g. 9 volts) to provide the necessary electrical impulses to operate the valve solenoids. The batteries on most existing battery powered controllers must be changed every few weeks or months, making them inconvenient to maintain and potentially unreliable to depend on for controlling irrigation cycles. At least one controller has addressed the problem of conserving the low voltage batteries used to operate the computing circuitry. In U.S. Pat. No. 4,423,484 to Hamilton, the microcomputer is turned off between cycles thereby conserving the low voltage batteries. However, the Hamilton controller does not address conservation of the higher voltage batteries used to operate the solenoids.

It is typical for an irrigation controller to use charging capacitors to operate the valve latching solenoids. These are generally large capacitors of 1000 micro farads or more. Most controllers (including Hamilton) maintain these capacitors in a charged condition, ready for immediate discharge to the solenoid upon receipt of a signal from the microprocessor (see e.g. U.S. Pat. No. 4,718,454 to Appleby). In addition, in most controllers these capacitors have an uninterrupted connection back to the high voltage (e.g. 9, 12 or 18 volts) batteries from which they are charged. Both of these situations reduce the life of the high voltage batteries, and give rise to other potential problems with the controller.

It is known that all charged capacitors leak over time. This places a constant drain on the high voltage batteries to which they are connected. Such leakage significantly increases with temperature increases. Thus, a fully charged capacitor in a controller located in the middle of an unshaded field during the hot summer months can rapidly deplete the high voltage batteries, even when not in use. The larger the capacitor, the larger the leakage current. Also the higher the ambient temperature, the higher the leakage. This leakage is very significant and could be as much as hundreds of microamps. The leakage causes the capacitor to draw on the battery power supply in order to stay fully charged, thereby wasting energy and leading to the frequent need to change batteries without even any solenoid operation. Preventing this leakage would conserve the life of the high voltage batteries.

Battery operated controllers such as Hamilton use the high voltage batteries for operating both the solenoids and the electronics. Since most low power circuits operate from 3 to 5 volts DC, the high voltage batteries must be reduced and regulated, thereby wasting a considerable amount of energy.

In all controllers, the large capacitors are fully discharged in order to operate the valve solenoids. The capacitors are then recharged from the high voltage batteries. At the instant the discharge occurs, current may also be drawn directly from the high voltage batteries themselves, resulting in unnecessary depletion of the high voltage batteries.

SUMMARY OF THE INVENTION

The present invention overcomes the disadvantages of prior art irrigation control systems by providing a battery powered irrigation valve controller that conserves the life of both the low voltage batteries which operate the microprocessor circuitry as well as the high voltage batteries which operate the external latching valve solenoids.

Two sets of batteries are used in the present invention. A first set of one or more low voltage batteries (typically 3.0 to 3.6 volts) is dedicated to the microprocessor. This low voltage powers the microprocessor directly without the need for regulation which would otherwise waste energy. In addition, the microprocessor is used in a sampling mode such that it is asleep for about 99% of the time. Approximately once per second it wakes up and samples the programming switches for about 10 milliseconds, and then goes back to sleep. Since the sleep mode power is about 15 microamps while the awake mode draws about 1 milliamp, the average power draw is only about 24 microamps, or a 99% power saving. This arrangement extends the life of the low voltage battery source for as long as 8 to 10 years.

A second set of one or more high voltage batteries is provided which is only used for charging the capacitors which operate the solenoids. This obviates any need to reduce or regulate this battery source for use by the electronic circuitry, so this potential energy loss is avoided.

In the present invention, the large capacitors are not charged until just a few seconds before the solenoid is to be energized. At that point, the microprocessor enables a transistor to turn on and charge such a capacitor. After about 5 RC time constants, for all intents and purposes, the capacitor becomes fully charged. Following an isolation step (discussed below), a switching device (e.g. relay, triac, or the like) is used to quickly discharge the capacitor into the latching solenoid. Thereafter, the capacitor remains discharged waiting for the next operation. Leaving the capacitor uncharged for long periods of time effectively eliminates capacitive leakage current.

The present invention avoids another source of energy waste found in typical battery operation. With existing controllers, when the capacitor discharges, the charging resistor is still connected from the high voltage battery source to the solenoid. This results in a further draw of current from the battery directly by the solenoid, which also depletes the battery. In the present design, the charging circuit is disabled and isolated by the charging transistor a few milliseconds prior to the capacitive discharge, thereby eliminating this unnecessary power drain. The circuit remains isolated until approximately 5 RC time constants (a few seconds) before the next operation, at which point the high voltage battery source is again connected to the capacitor for charging followed again by isolation immediately before discharge.

Lithium batteries are recommended for both the low and high voltage circuits. Lithium batteries have extremely long shelf life (10 years), extremely low self discharge (less than 1% per year), and are rated for full performance over a wide temperature range up to 85 degrees Centigrade. Most other types of batteries would self discharge under typical ambient conditions within a year. Also, lithium batteries have double the energy capacity of alkaline batteries, and are lighter in weight.

Finally, the circuit board of the present invention may be potted (encapsulated) so as to prevent impurities from corroding any of the component parts.

It is therefore a primary object of the present invention to provide an improved battery powered programmable irrigation valve controller having extended battery life.

It is a further important object of the present invention to provide a battery powered programmable irrigation valve controller which does not maintain its solenoid-activation capacitors in a fully charged condition at all times.

It is a further important object of the present invention to provide a battery powered programmable irrigation valve controller having a microprocessor which does not allow each capacitor to be charged until just before it is known to be needed for discharge to activate the solenoid.

It is a further important object of the present invention to provide a battery powered programmable irrigation valve controller having a load isolation circuit which engages to separate the high voltage batteries from the capacitors immediately prior to discharge of the capacitors.

It is a further important object of the present invention to provide a battery powered programmable irrigation valve controller having a microprocessor circuit which isolates the capacitor from the high voltage batteries several milliseconds before the solenoid is discharged, so as not to also draw on the capacitor-charging batteries during the discharge operation.

It is a further object of the present invention to provide a battery powered programmable irrigation valve controller in which the microprocessor on the printed circuit board does not perform continuous sampling, but instead samples only once a second for several milliseconds.

It is a further object of the present invention to provide a battery powered programmable irrigation valve controller in which the microprocessor on the printed circuit board is not running in a current consuming operation except once every second for a few milliseconds, thereby prolonging the life of the battery.

It is a further object of the present invention to provide a battery powered programmable irrigation valve controller in which the circuit board is encapsulated in epoxy so as to prevent impurities from corroding any of the component parts, and minimizing exposure to electrostatic discharge.

It is a further object of the present invention to provide a battery powered programmable irrigation valve controller which uses lithium batteries for both the high and low voltage batteries because of their greater reliability and long life.

Other objects of the invention will be apparent from the detailed descriptions and the claims herein.

DETAILED DESCRIPTION OF THE DRAWINGS

Figure 1:
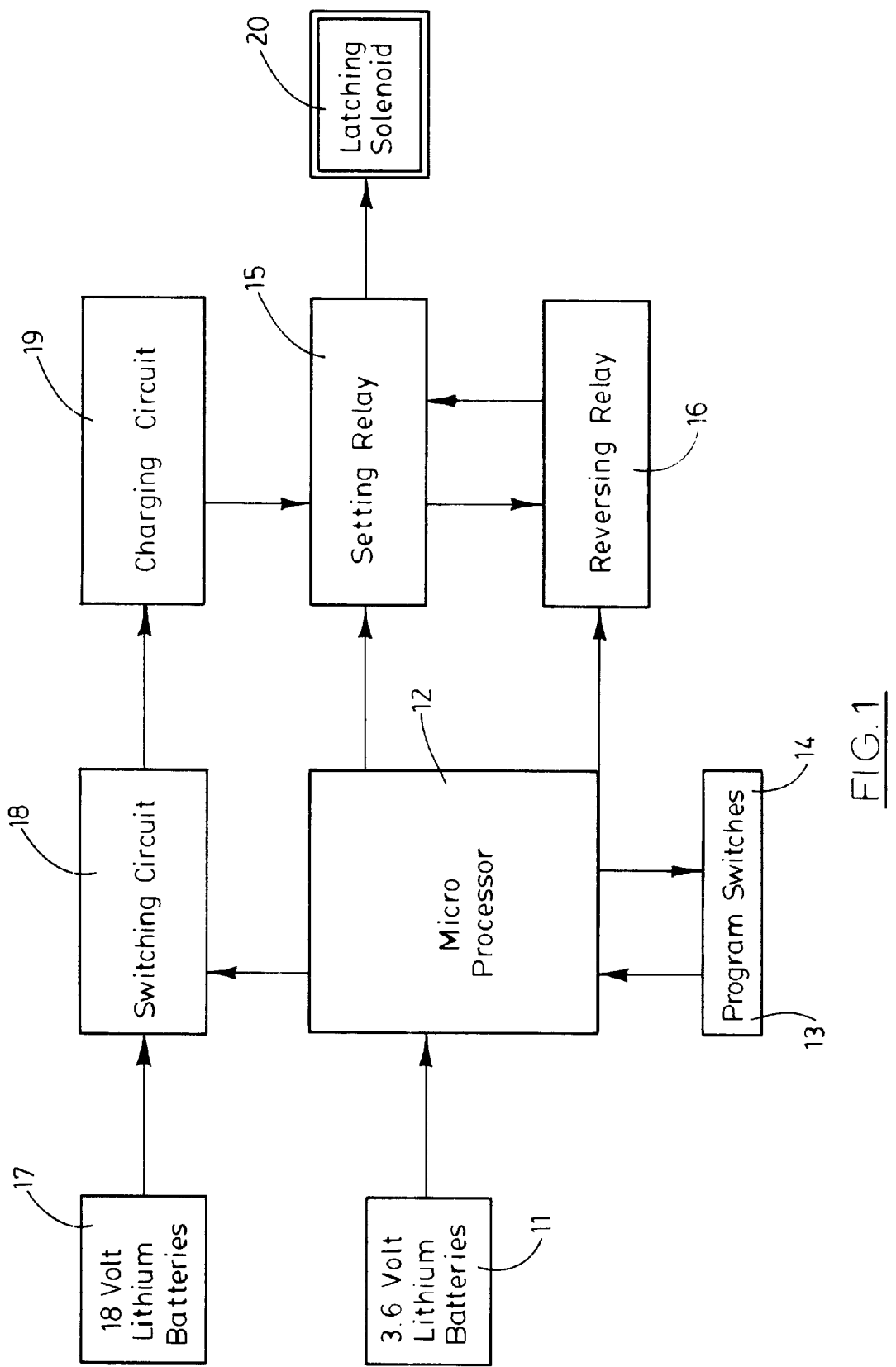
FIG. 1 is block diagram showing the general configuration of the battery powered controller of the present invention.
Figure 2:
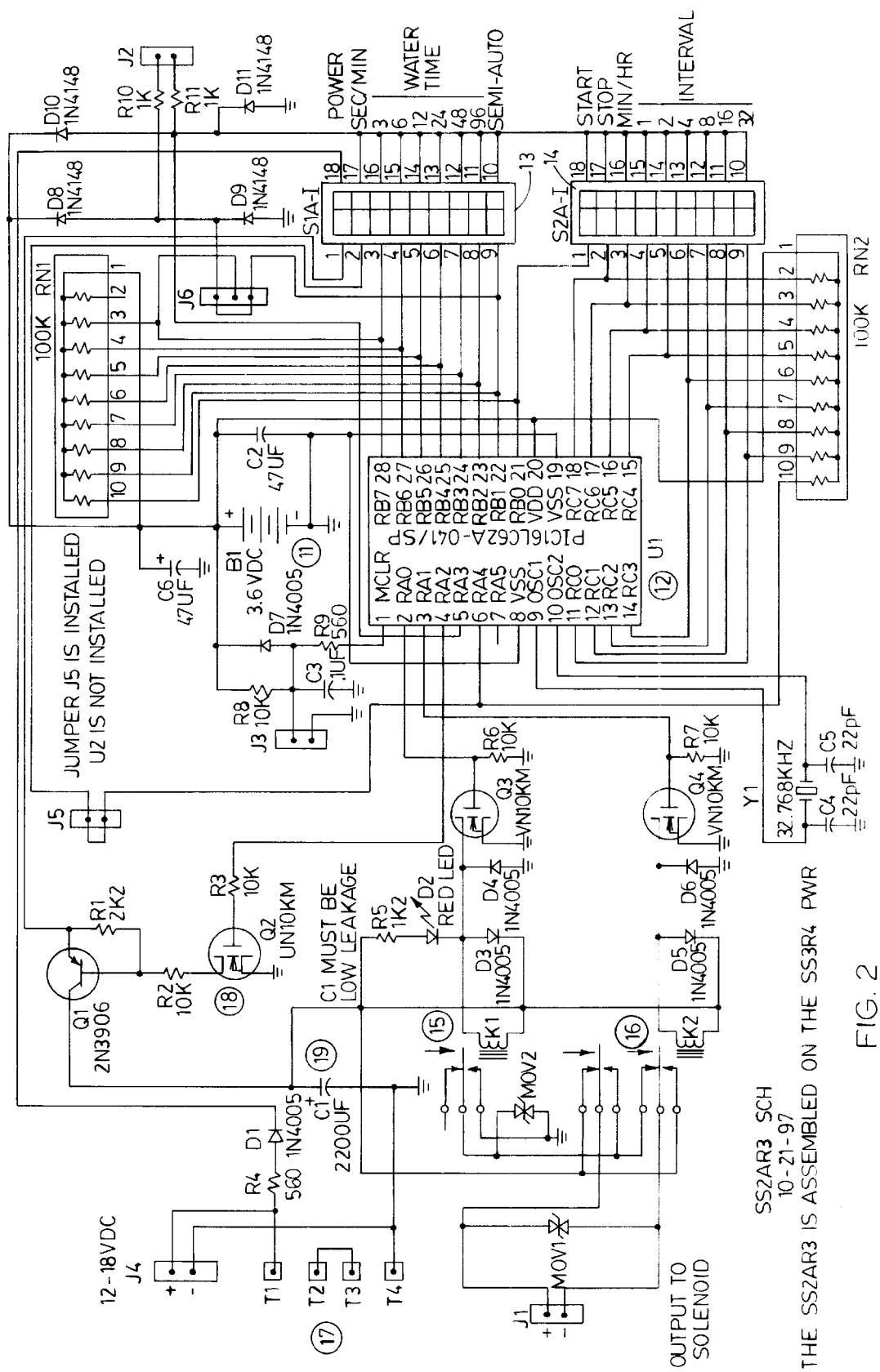
FIG. 2 is a circuit diagram of the battery powered controller of the present invention.

Referring to the drawings wherein like reference characters designate like or corresponding parts throughout the several views, and referring particularly to FIGS. 1 and 2, it is seen that the invention includes a microprocessor 12 powered by a 3.6 volt lithium battery source 11 made up of at least one battery. Although the following description refers to operation of a single capacitor and solenoid, the invention may be easily adapted to operate multiple capacitors and multiple solenoids while maintaining the important power saving features described herein.

The microprocessor may be programmed using two sets of dip switches, set 13 and set 14. Microprocessor 12 controls a first relay 15 (K1) which is used to send a setting or activation discharge from a large capacitor 19 (C1) in the controller to a solenoid 20 (to open a valve). It also controls a second relay 16 (K2) which is used to send a reverse or de-activation discharge from large capacitor 19 to solenoid 20 (to close a valve).

The microprocessor also controls a switching circuit 18 (using transistors Q1 and Q2) between the high voltage battery source 17 (if an AC or DC power source is available, it can be used instead of battery source 17) and the large charging capacitors such as 19. Two functions are performed by this circuit under control of the microprocessor. The first function is to delay the charging of capacitor 19 until a given interval just before it is to be discharged to solenoid 20. The second function is to isolate the charging battery source 17 from the recently-charged capacitor 19 immediately prior to discharge.

Referring to FIG. 2, it is seen that the switches of the first set 13 (S1A-I in FIG. 2) provide the following possible input functions: power on/off (switch 1); selection between seconds and minutes (switch 2); water time of 3 units (switch 3); water time of 6 units (switch 4); water time of 12 units (switch 5); water time of 24 units (switch 6); water time of 48 units (switch 7); water time of 96 units (switch 8); and semi-automatic mode (switch 9). These timing units can be combined to provide a wide range of time settings.

The switches of the second set 14 (S2A-I in FIG. 2) provide the following possible input functions: start (switch 1); stop (switch 2); select between minutes and hours (switch 3); time interval of 1 unit (switch 4); time interval of 2 units (switch 5); time interval of 4 units (switch 6); time interval of 8 units (switch 7); time interval of 16 units (switch 8); time interval of 32 units (switch 9). These timing selections can also be combined.

The microprocessor 12 reads or samples the input from switches 13 and 14 over line 31. This sampling is only performed at infrequent intervals (e.g. once a second for 20 milliseconds). During the remainder of the time, the microprocessor is dormant and only consuming a few microamps from low voltage battery source 11. Meanwhile, capacitor 19 is left in an uncharged state. The sampling tells the microprocessor what function is to be performed when, according to the settings of switches 13 and 14.

Figure 3:
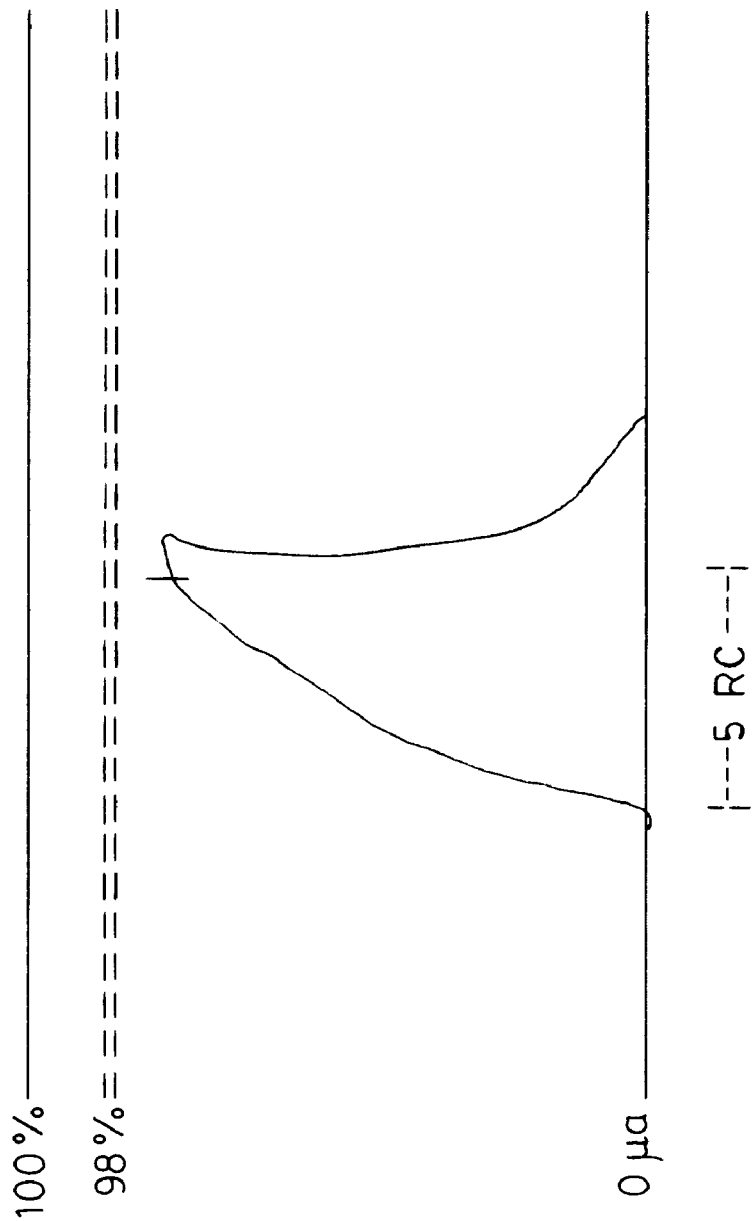
FIG. 3 is a chart showing the charge and discharge of a large capacitor of the present invention over time.

By using the sampling and its internal clock, the microprocessor is able to detect that a solenoid operation (activation or deactivation) is upcoming. Approximately 5 seconds (5 RC) before such operation is to occur, the microprocessor sends a signal from pin 4 (see FIG. 2) to transistor Q2 causing transistor switch Q1 to make the connection between the high voltage battery source 17 and capacitor 19. This causes capacitor 19 to become charged (see FIG. 3). Then, just a few milliseconds before the time for discharging capacitor 19, the microprocessor sends a second signal to turn off transistors Q1 and Q2 thereby isolating the high voltage battery source 17 from capacitor 19. Almost immediately thereafter, capacitor 19 is discharged to the solenoid. Capacitor 19 remains in a discharged state until just before the next time a solenoid operation occurs. At that time, the above process is repeated for that solenoid operation, etc.

Microprocessor 20 controls whether the charge sent to the solenoid is an activation pulse (to open the solenoid) or deactivation pulse (to close the solenoid) by using relay 15 (K1) and double pole reversing relay 16 (K2). Solid state switching mechanisms could be used in place of relays K1 and K2. A signal from microprocessor pin 2 to transistor Q3 operates relay K1 causing a direct charge to be sent via relay K1 to open the solenoid 20. signals from microprocessor pins 2 and 3 to transistors Q3 and Q4 operate both relays K1 and K2, causing a reverse charge to be sent via relay K1 and double pole reversing relay K2 to close solenoid 20.

DESCRIPTION OF THE PREFERRED EMBODIMENTS

In the preferred embodiment, a single 3.6 volt AA sized lithium battery 11 is used to power the printed circuit board and microprocessor 20, and two 9-volt replaceable lithium batteries 17 are used in series to provide 18 volts of power to the capacitors. Each capacitor 19 (C1 in FIG. 2) should have a capacity of between approximately 1000 and 2500 micro farads ($\mu$F) at 25 volts, preferably 2200 $\mu$F at 25 volts.

The preferred delay time before each capacitor is allowed to be charged is approximately 5 seconds, although a longer time interval may be employed (e.g. 10 seconds) so long as it is reasonably close to the time for discharge so that leakage is minimized. The 5 time constant interval generally allows the 2200 $\mu$F capacitor 19 to reach a 98% charge from the 18-volt power supply 17 before it is discharged to solenoid 20, thereby avoiding any leakage.

The capacitor-charging battery source 17 should be isolated from the capacitors at some time prior to discharge of the capacitors. Although this isolation may be performed at any time before discharge, the preferred time interval is approximately 31 milliseconds.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

In particular, it should be noted that although the diagram of FIG. 2 shows circuitry for operation of a single capacitor and solenoid, this circuitry can be easily adapted for use in controlling multiple capacitors and solenoids while maintaining the same power saving features of the invention (maintaining capacitor in discharged condition until just seconds prior to discharge, isolation of capacitor from power source immediately prior to discharge, quiescent microprocessor, etc.).

We claim:

1. A circuit for energizing at least one valve solenoid comprising:
    a. a first DC battery power source, at least one DC charge storage means, a first switchable connection between said first power source and said DC charge storage means, and a second switchable connection between said DC charge storage means and said solenoid; and
    b. a second low voltage DC battery power source, and a microprocessor means connected to said low voltage DC battery power source for controlling said first and second switchable connections such that said first connection defaults to an open condition, but upon the commencement of a programmed operation by said microprocessor, said first connection is closed for a measured interval in order to provide a charge to said DC charge storage means whereupon said first connection is again opened just before said second connection is closed causing said DC charge storage means to be discharged to said solenoid.

2. The circuit of claim 1 wherein a third switchable connection is provided between said DC charge storage means and said solenoid, said third connection including circuitry to reverse the polarity of the charge to said solenoid such that upon the conclusion of a programmed operation by said microprocessor, said first connection is closed for a measured interval in order to provide a charge to said DC charge storage means whereupon said first connection is again opened just before said third connection is closed causing said DC charge storage means to be discharged to said solenoid.

3. The circuit of claim 2 wherein said microprocessor means includes an internal clock and is connected to a plurality of resettable input switches, said microprocessor means being programmed to default to a dormant non-power consuming state except for periodic sampling of said input switches at preset intervals according to said clock.

4. The circuit of claim 2 wherein the measured interval for providing a charge to said DC charge storage means is about five seconds.

5. The circuit of claim 2 wherein the time between the opening of said first connection and the discharge of said DC charge storage means to said solenoid is about 31 milliseconds.

6. The controller of claim 2 wherein said first DC battery power source has a voltage of between about 9 and about 18 volts DC.

7. The controller of claim 2 wherein said second low voltage DC battery power source has a voltage of between about 3 and about 4 volts DC.

8. The controller of claim 2 wherein said DC charge storage means has a capacity of between 1000 and 2500 micro farads.

9. A controller for energizing a valve solenoid comprising:
    a. a computing means including an internal clock for controlling an electronic circuit;
    b. resettable switch means connected to said computing means for supplying an input signal thereto;
    c. a first means for supplying low voltage electrical energy to said computing means;
    d. a second means for supplying higher voltage electrical energy to said circuit;
    e. at least one DC charge storage means;
    f. a first switchable connection means between said higher voltage energy supply means and said DC charge storage means, said connection being controlled by said computing means according to an input signal such that said first connection is closed for a pre-determined time interval and thereafter opened in order to provide a charge to said DC charge storage means; and
    g. a second switchable connection means between said DC charge storage means and said solenoid, said second connection being controlled by said computing means such that said second connection is closed immediately following the opening of said first connection in order to discharge said DC charge storage means to said solenoid.

10. The controller of claim 9 further including a means between said DC charge storage means and said solenoid controlled by said computing means for reversing the polarity of the discharge from said DC charge storage means to said solenoid.

11. The controller of claim 10 wherein said first switch is closed for a pre-determined interval and thereafter opened in order to provide a charge to said DC charge storage means, said reversing means is activated in order to reverse the polarity of the discharge to said solenoid, and said second connection is then closed immediately following the opening of said first connection in order to discharge said DC charge storage means to said solenoid.

12. The controller of claim 9 wherein said computing means remains inactivated except about once per second for about 10 milliseconds at which time said clock causes said computing means to sample said resettable switches to determine whether any input signal is present.

13. The controller of claim 9 wherein said pre-determined time interval is about 5 seconds.

14. The controller of claim 9 wherein said first means for supplying low voltage electrical energy is a battery source having a voltage of between about 3 and about 4 volts DC.

15. The controller of claim 9 wherein said second means for supplying higher voltage electrical energy is a battery source having a voltage of between about 9 and about 18 volts DC.

16. The controller of claim 9 wherein said DC charge storage means has a capacity of between 1000 and 2500 micro farads.

17. The controller of claim 9 wherein the time between the opening of said first connection and the discharge of said DC charge storage means to said solenoid is about 31 milliseconds.

18. A battery powered valve control system comprising:

a. a microprocessor including an internal clock for controlling an electrical circuit;

b. a plurality of resettable switches connected to said microprocessor for supplying an input signal thereto, said microprocessor being programmed to remain inactive except about once per second for an interval of about 10 milliseconds at which time said clock causes said microprocessor to sample said resettable switches to determine whether any input signal is present;

c. a first DC battery power source having a voltage of between about 3 and about 4 volts DC for supplying electrical energy to said microprocessor;

d. a second DC battery power source having a voltage of between about 9 and about 18 volts DC for supplying electrical energy to said circuit;

e. at least one DC charge storage means having a capacity of between 1000 and 2500 micro farads;

f. a first switchable connection between said second power source and said DC charge storage means, said connection being controlled by said microprocessor according to an input signal such that said first connection is closed for an interval of approximately five seconds and thereafter opened in order to provide a charge to said DC charge storage means;

g. a relay between said DC charge storage means and a solenoid, said relay being controlled by said microprocessor such that said relay is closed several milliseconds following the opening of said first connection in order to discharge said DC charge storage means to said solenoid; and h. a second relay between said DC charge storage means and said solenoid controlled by said microprocessor for alternatively reversing the polarity of the discharge from said DC charge storage means to said solenoid.

\* \* \* \* \*